3,328,155
1-NITRO-3-NITROSOBENZENE AND DERIVATIVES THEREOF AS HERBICIDES
Bryant Leonidas Walworth, Pennington, N.J., assignor to American Cyanamid Company, Stamford, Conn., a corporation of Maine
No Drawing. Filed June 19, 1964, Ser. No. 376,565
6 Claims. (Cl. 71—2.3)

The present invention relates to herbicides. More particularly, it is concerned with herbicidal compositions comprising as an active ingredient a trisubstituted phenyl compound represented by the formula:

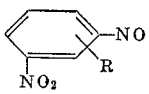

wherein R is hydrogen and either an alkyl or an alkoxy substituent of 1 to 4 carbon atoms.

It is known that certain polyalkyl dinitrobenzenes can be employed in herbicidal compositions for the control or elimination of noxious grasses, such as crabgrass. However, with respect to equally noxious broadleaf plants, such polysubstituted dinitrobenzenes have little or no effect. Since many desirable crops are infested with broadleaf plants which markedly reduce the yield of desired crops, it is unfortunate to find that the use of polysubstituted dinitrobenzenes of the prior practice are ineffectual. If a phenyl derivative of increased selectivity could be found to both eliminate crabgrass and broadleaf plants, such as derivative would fill a long-sought need.

Unexpectedly, monosubstituted lower alkyl or lower alkoxy 1-nitro-3-nitrosobenzene compounds have been found to both substantially eliminate crabgrass or other noxious grasses as well as broadleaf plants while permitting a desired crop to continue its growth cycle. This is particularly surprising because the monosubstituted alkyl 1-nitro-3-nitrosobenzenes of the present invention would be expected to behave in the same fashion as the well-known closely-related polysubstituted alkyl dinitrobenzenes.

Illustrative of the 1-nitro-3-nitrosophenyl compounds which may be employed in the compositions of this invention are:

1-nitro-3-nitrosobenzene,
2-nitro-4-nitrosotoluene,
2-nitro-6-nitrosoanisole, and
3-nitro-5-nitrosoanisole.

b-Nitronitrosophenyl compounds employed in the compositions of the present invention may be prepared according to any desired procedure known in the art.

The herbicidal compositions of this invention are prepared by admixing the active compound with a carrier material of the kind referred to in the art as a pest control adjuvant in solid or liquid form. Solid carriers include talcs, clays, diatomaceous earth, pumice, silica, chalk, walnut shell flour and the like.

Liquid compositions may be prepared by dissolving the active compound in an organic solvent and then mixing the resulting solution with an emulsifying agent. The mixture is next dispersed in water prior to application. The nitronitrosophenyl compounds are soluble in the common organic solvents such as aromatic type solvents and low molecular weight alcohols, ketones and esters. The nitronitroso compounds may also be applied as liquid sprays prepared by dissolving the active ingredient in an organic solvent and admixing resultant mixture with a petroleum based solvent, such as fuel oil or kerosene.

Emulsifying or surface-active dispersing agents which may be employed are those customarily used in the art for the preparation of oil-in-water emulsions. A number of varieties of ionic and non-ionic dispersing or emulsifying agents such as long-chain alkyl benzenesulfonates or polyglycol ethers are commercially available. The emulsifying agent is usually employed in small concentrations, for example, in the range of from about 0.05 percent to 5.0 percent by weight of the total weight of the spray composition.

The herbicidal composition may be applied either as a spray or in the form of a dust to the locus or area to be protected from undesirable plant growth. The amount of the active nitro-nitrosophenyl compound employed in the herbicidal composition of the present invention will vary greatly according to the manner in which and the purpose for which the composition is to be used. Concentrates for subsequent use in preparing spray formulations may contain as much as 90 percent or more by weight of the active ingredient. Sprays or dusts for direct use will be relatively dilute, in some cases as low as 0.5 percent or less.

In general, the compounds of the invention are active when applied either as a preemergence or postemergence herbicide. They exhibit broad spectrum control when applied at high rates. They are also highly selective when applied preemergence at low rates. This latter property affords a significant advantage in the cultivation of certain specific crops, such as corn, cotton, sugar beets, sugar cane, soybeans and peanuts which have been found to be particularly tolerant of the compounds of the invention at rates normally highly toxic to monocotylendonous and dicotylendonous weeds.

The present invention will be further illustrated, but not limited, by the following examples in which 1-nitro-3-nitrosobenzene is employed as the typical test compound.

EXAMPLE 1

Germination test

Fifty radish seeds (var. Early Scarlet Globe) and 50 wheat seeds (var. Genessee) were placed in separate 2-oz. bottles each containing 50 mls. of an aqueous solution or finely divided suspension of the test compound. The bottles were capped and placed on a rotating drum to afford agitation, aeration and uniform exposure to the test compound. Twenty-four hours later the seeds were removed from the bottle, thoroughly rinsed with tap water and placed on moist blotting paper. After 5 days in an incubation cabinet, seeds were observed. Herbicidal effects were noted as the percent seeds not germinating or any other effect on germination and subsequent growth.

TABLE I

| Compound | Cpd. Rate, p.p.m. | Percent Kill Radish | Percent Kill Wheat |
|---|---|---|---|
| 1-nitro-3-nitrosobenzene | 1,000 | 100 | 80 |

EXAMPLE 2

Effectiveness of the compositions of the instant invention as postemergence herbicides was demonstrated by the following tests in which a variety of healthy plants were treated with solutions containing different levels of active ingredient.

In the tests below, the plant species growing in small containers were sprayed with solutions containing sufficient active ingredient to produce treatments equivalent to 10 pounds per acre of active ingredient. After treatment the plants were placed in the greenhouse and cared for in the usual manner. Three weeks after treatment the test were terminated, all plants were examined and the results recorded in Table II below. In recording results of various treatments, the Herbitoxicity Index, as defined below, was employed.

The data recorded in Table II establishes the high degree of effectivenes of the compounds of the instant invention as postemergence herbicides when applied at rates equivalent to as low as 10 pounds per acre or more on annual weeds.

TABLE II

| Compound | Rate, lb./A. | Herbitoxicity Index* | | | | | | |
|---|---|---|---|---|---|---|---|---|
| | | Kochia | Lambs-quarters | Wild mustard | Pig-weed | Barn-yard grass | Crab-grass | Green fox-tail |
| O₂N—⟨ ⟩—N=O | 10 | 9 | 9 | 9— | 9 | 9 | 8s | 6 |

*Herbitoxicity Index is defined as:
9=100% reduction in stand.
9—=1 or 2 stunted plants remaining.
8=85—<100% reduction in stand.
7=70—<85% reduction in stand.
6=60—<70% reduction in stand.
5=50—<60% reduction in stand.
4=40—<50% reduction in stand.
3=30—<40% reduction in stand.
2=20—<30% reduction in stand.
1=10—<20% reduction in stand.
0=No apparent effect.
s=Severe injury.
m=Moderate injury.
t=Trace to slight injury.
a=Abnormal, malformed, twisted.

EXAMPLE 3

To demonstrate the selective preemergence herbicidal activity of the compounds of the instant invention, the test compound was dissolved in 50/50% acetone-water mixture in sufficient amounts to produce the desired concentrations of ingredients in solution. Half-pint quantities of potting soil were separately seeded to various annual weeds or crops. These seed-soil mixtures were then added to separate cups containing about one inch of potting soil and lightly tamped. The seeded cups were then sprayed with the selected test solutions previously prepared and calculated to deposit the test compound at a given rate. After treatment the cups were placed on greenhouse benches and attended to daily in the conventional manner. Three weeks after treatment the cups were examined and rated according to the Herbitoxicity Index set forth in Example 2 above. The results of the instant preemergence tests are recorded in Table III below.

The data clearly establishes broad spectrum preemergence control at rates of application exceeding 10 pounds per acre of active ingredient. They also demonstrate selective preemergence control of annual weeds at rates equivalent to ten pounds per acre or less. Since corn, sugar beets, soybeans and peanuts are found to be particularly resistant ot the compounds of the instant invention, control of annual weeds in the presence of these crops is readily and conveniently achieved.

TABLE III

| Compound | Rate, lb./A. | Herbitoxicity Index | | | | | | | |
|---|---|---|---|---|---|---|---|---|---|
| | | Weeds | | | | | Crops | | |
| | | Wild mustard | Pig-weed | Barn-yard grass | Crab-grass | Green fox-tail | Corn | Sugar beets | Soy-beans |
| O₂N—⟨ ⟩—N=O | 10 | 9 | 9 | 9— | 9— | 7 | m | m | m |

I claim:

1. A method of controlling undesirable plant species in the presence of desirable crop comprising: applying a herbicidaly effective amount of a compound of the formula:

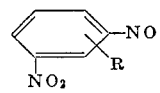

wherein R is a substituent selected from the group consisting of hydrogen, lower alkyl and lower alkoxy.

2. The method of claim 1 wherein herbicidal compound is 1-nitro-3-nitrosobenzene.

3. A method for the selective preemergence control of monocotylendonous and dicotylendonous weeds from corn, sugar beets and soybeans, comprising: applying to the area containing seeded soil a herbicidally effective amount of a compound of the formula:

wherein R is a substituent selected from the group consisting of hydrogen, lower alkyl and lower alkoxy radicals.

4. A method according to claim 3 in which the compound is 1-nitro-3-nitrosobenzene.

5. A method for the postemergence control of undesirable monocotylendonous and dicotylendonous plant growth comprising: applying to the foliage of said undesirable plant a herbicidally effective amount of a compound of the formula:

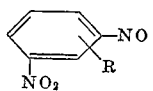

wherein R is a substituent selected from the group consisting of hydrogen, lower alkyl and lower alkoxy.

6. A method according to claim 5 wherein the compound is 1-nitro-3-nitrosobenzene.

References Cited

FOREIGN PATENTS 536,637  8/1955  Belgium.
1,088,681  9/1954  France.

LEWIS GOTTS, *Primary Examiner.*

M. M. KASSENOFF, *Assistant Examiner.*